United States Patent
Krekeler et al.

[15] 3,676,508

[45] July 11, 1972

[54] PROCESS FOR THE MANUFACTURE OF CARBON TETRACHLORIDE

[72] Inventors: Hans Krekeler, Wiesbaden; Helmut Meidert; Wilhelm Riemenschneider, both of Frankfurt/Main, all of Germany; Lothar Heinz Hornig, deceased, late of Frankfurt/Main-Schwanheim, Germany by Anneliese Hornig, nee Münich, co-heiress, Frankfurt/Main, Germany

[73] Assignee: Farbwerke Hoechst Aktiengesellschaft vormals Meister Lucius & Bruning, Main, Germany

[22] Filed: Jan. 21, 1970

[21] Appl. No.: 4,748

[30] Foreign Application Priority Data

Jan. 30, 1969 Germany..................P 19 04 426.9

[52] U.S. Cl............................................260/664
[51] Int. Cl.............................................C07c 19/06
[58] Field of Search....................................260/664

[56] References Cited

UNITED STATES PATENTS 2,957,033  10/1960  Degeorges et al. ..................260/664

*Primary Examiner*—Daniel D. Horwitz
*Attorney*—Curtis, Morris & Safford

[57] ABSTRACT

In the process for the manufacture of carbon tetrachloride from benzene, mixtures of benzene and chlorinated aliphatic or aromatic compounds, or chlorinated aromatic compounds, with chlorine in an excess amount of up to 300 percent, in the absence of catalysts in the gaseous phase in two reaction stages at a temperature in the first stage of from 6° to 400° C. and in the second stage of from 400° to 800° C. the space-time-yield is considerably increased by operating in both reaction stages under a pressure in the range of from 200 to 700 atmospheres. The reaction is carried out in a corrosion resistant reactor in continuous manner using 0.2 to 4 moles of organic compound or compounds per liter of reaction space per second.

2 Claims, No Drawings

PROCESS FOR THE MANUFACTURE OF CARBON TETRACHLORIDE

The present invention relates to an improvement in the process for the manufacture of carbon tetrachloride from benzene or mixtures of benzene with chlorinated aliphatic or aromatic compounds with chlorine in the gaseous phase at elevated temperature and pressure.

In copending application, Ser. No. 765,967 filed Oct. 8, 1968 it has been proposed to produce carbon tetrachloride at elevated temperature and pressure in the absence of catalysts by continuously reacting in the gaseous phase benzene, mixtures of benzene and chlorinated aromatic compounds, mixtures of benzene and chlorinated aliphatic compounds, or chlorinated aromatic compounds, with chlorine in a stoichiometric proportion or with an excess amount of chlorine of up to 300 percent tetrachloride. In the first stage of the process the reaction components are passed through a prereaction zone kept at a temperature in the range of from 6° to 400° C., and in the second stage they are reacted in a corrosion resistant reactor in the gaseous phase at a temperature in the range of from 400° to 800° C. under a pressure in the range of from 20 to 200 atmospheres gauge to obtain carbon tetrachloride.

The present invention provides a process for the manufacture of carbon tetrachloride from benzene, a mixture of benzene and chlorinated aromatic compounds, a mixture of benzene and chlorinated aliphatic compounds, or chlorinated aromatic compounds and chlorine, in the absence of catalysts in a stoichiometric proportion or with an excess amount of chlorine of up to 300 percent in the gaseous phase, under pressure, the reaction components being passed in the first stage of the process through a prereaction zone kept at a temperature in the range of from 6° to 400° C., and being then heated in the second stage of the process in a corrosion resistant reactor at a temperature in the range of from 400° to 800° C., which comprises carrying out the reactions in the prereaction zone and in the main reaction zone under a pressure within the range of from 200 to 700 atmospheres gauge.

By carrying out the reaction within this range of elevated pressure of from 200 to 700 atmospheres gauge the rate of conversion of the chlorolysis of benzene or other chlorinated aliphatic or aromatic hydrocarbons can be considerably improved. At the same reaction temperature and under a pressure above 200 atmospheres gauge the conversion of benzene, for example, to carbon tetrachloride amounts to 97 – 98 percent. The balance of 2 to 3 percent is hexachlorobenzene which can be separated and recycled. The high conversion rate under high pressure offers the further advantage that the reaction can be carried out under lower temperatures without the yield being reduced so that less strain is exerted on the reactor material.

When the reaction is carried out under the specified high pressure, carbon tetrachloride is obtained in an especially pure form. Secondary products, for example tetrachloroethylene and trichloroethylene, are formed in an amount of less than 0.1 percent.

A further advantage of the use of pressure above 200 atmospheres is that using high amounts of organic compounds and the corresponding amounts of chlorine, the space-time-yield can be substantially improved. It could have been expected that an increase in the throughput would result in a higher space-time-yield but simultaneously the shortening of the residence time would involve a diminution of the conversion rate. It has surprisingly been found, however, that in spite of the increase in the space-time-yield by 200 to 400 percent, in the pressure range of from 240 to 350 atmospheres gauge the conversion rate is not reduced to an essential degree.

The required pressure of from 200 to 700 atmospheres gauge is best produced by means of piston pumps with which chlorine as well as the organic feedstock are pumped in liquid form into the prereaction zone. The pressure is released behind the main reaction zone by single-stage or multi-stage relief valves operated either manually or with the aid of a control mechanism.

More particularly, the process of the invention for the manufacture of carbon tetrachloride is carried out as follows: 0.2 to 4 moles of the respective feedstock, (the term feedstock being intended to include benzene, mixtures of benzene and chlorinated aromatic compounds, mixtures of benzene and chlorinated aliphatic compounds and chlorinated aromatic compounds), and chlorine in a stoichiometric excess of from 25 to 300 percent, calculated on the theoretically necessary amount, are used per liter of reactor volume per hour.

The temperature in the prereaction zone is within the range of from 6° to 400° C., preferably 250° to 350° C. The lower temperature limit is defined by the melting point of the respective feedstock. When, for example, hexachlorobenzene is used, the temperature in the prereaction zone should be at least 228° C. The upper temperature limit of about 400° C. is given by the beginning cracking reaction of the feedstock introduced together with chlorine. The reaction components are preferably pumped into the prereaction zone in liquid form. They can be mixed in the cold state, for example at room temperature, before they enter the prereaction zone or in said zone. In respect to the lower temperature limit it should be noted that when benzene and chlorine are introduced into the reactor without special preheating, they must be passed through a preheating zone having a temperature of, for example, 6° to 250° C. This short heating zone the reactants should pass from the site of mixing until they have reached a temperature of 225° C. belongs to the prereaction zone. It is also possible, however, to do without a mixing zone before the prereaction zone and to mix the components by known measures, for example with the help of installations inside the prereaction zone. If desired, the components may be preheated separately, mixed in the gaseous state and then introduced into the prereaction zone. When mixture of benzene and chlorinated compounds are used, the components are advantageously mixed prior to being fed to the prereaction zone if the mixtures contain a small proportion of benzene. ALternatively, the two components may be introduced separately into the prereaction zone, this latter mode of operation being preferred with a higher proportion of benzene in the mixture.

The prereaction zone may be constructed in various ways. There may be used, for example, a tube or a spiral tube disposed close to the reactor and heated to the desired temperature outside the reactor by means of a special heating device, for example with high pressure steam, an oil or salt bath or an electric heating. It is likewise possible to arrange the prereaction zone inside of the reactor in the form of a tube pr spiral tube which ensures a better utilization and additional control of the reaction heat. A further variation consists in using a longer tube reactor the lower part of which serves as prereaction zone by maintaining therein the specified temperature of from 6° to 400° C. It is also possible to dispose the prereaction zone at the outlet of the main reactor and to cool the reaction product with the help of a counter-current heat exchanger in which the chlorine and the feedstock are simultaneously preheated. Other designs of the prereaction zone different from those described above may also be chosen to maintain the desired temperature range and to mix the reaction components.

When benzene is exclusively used, the proportion of chlorine to benzene is determined by the equation

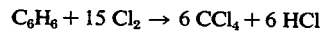

$$C_6H_6 + 15\ Cl_2 \rightarrow 6\ CCl_4 + 6\ HCl$$

In this case the amounts used should correspond to the stoichiometric amounts of the above equation, a small excess of chlorine up to about 25 moles percent being, however, advantageous. By the theoretically required amount of chlorine there is meant according to the above equation the stoichiometric amount of 15 moles of chlorine per mole of benzene necessary for the quantitative conversion of benzene to carbon tetrachloride. When proceeding in this manner it is not possible, however, to obtain a 100 percent conversion of the benzene to carbon tetrachloride under reasonable working conditions, because certain amounts of by-products are additionally formed, especially hexachlorobenzene. Other by-products formed in small amounts are, for example, hexachloroethane, perchloroethylene and trichloroethylene.

The aforesaid by-products may be separated by distillation, recycled into the reactor and transformed into carbon tetrachloride, but this requires additional technical expenditure. From among the chlorinated by-products the hexachlorobenzene is particularly disturbing as it readily deposits on the walls of the pipes, in valves and manometers, owing to its high melting point of 227° C. and the good sublimation properties, and may cause annoying interruptions of the process.

To avoid or reduce the formation of by-products the chlorine is used with respect to benzene in an excess amount of from 25 to 300 percent, preferably 50 to 150 percent of the amount theoretically required for the conversion to carbon tetrachloride. By a 25 percent excess amount of chlorine there is meant an amount of 18.75 moles of chlorine per mole of benzene, while a 300 percent excess amount of chlorine means an amount of 60 moles of chlorine per mole of benzene.

The upper limit of the excess amount of chlorine is given by the diminution of the space-time-yield because the chlorine which does not take part in the reaction requires reaction space and may, therefore, act as diluent and reduce the residence time to below a tolerable limit.

In the process of the invention for the manufacture of carbon tetrachloride, instead of benzene, mixtures of benzene with chlorinated aliphatic or aromatic compounds, or chlorinated aromatic compounds aromatic compounds can also successfully be used. Even with the use of very stable aromatic compounds, for example highly chlorinated diphenyls, the speed of formation of carbon tetrachloride is only reduced to an insignificant extent as compared with the use of benzene alone as feedstock. By raising the temperature up to 750° C. or increasing the residence time to more than 20 minutes or using an excess amount of chlorine of up to 300 percent or by varying several of these reaction conditions, very stable aromatic mono- or polychlorinated compounds can be transformed into carbon tetrachloride in a very smooth reaction with a rate of conversion of over 80 percent and a yield of more than 90 percent. The proportion of benzene to chlorinated aromatic compounds may vary of from 1 : 99 to 99 : 1 percent by weight, mixtures containing benzene and chlorinated aromatic compounds in a proportion of from 5 : 95 to 20 : 80 percent by weight being preferred.

Suitable chlorinated aromatic compounds in the process of the invention are monochlorobenzene, dichlorobenzene, trichlorobenzenes, tetrachlorobenzenes, pentachlorobenzenes, hexachlorobenzenes, mono- or polychlorinated naphthalenes, anthracenes, phenanthrenes, and higher condensed aromatic compounds containing alicyclic radicals added by condensation, mono- and polychlorinated diphenyls, triphenyls, and higher phenyl-substituted compounds, as well as aromatic compounds carrying aliphatic side chains and having one or several chlorine atoms in the nucleus and/or side chain.

As feedstock there may also be used mixtures of benzene and chlorinated aliphatic products characterized by a very violent chlorination reaction which often takes place with carbon formation. In the process of the invention their reaction can be retarded and they can be transformed into carbon tetrachloride without difficulty. On the other hand, the reaction speed of the highly chlorinated aliphatic compounds, such as hexachloroethane or perchlorobutane, which are very stable to further chlorinations, can be increased by adding benzene. Furthermore, especially the higher chlorinated aliphatic compounds have only a relatively little positive heat of formation in the chlorination so that the amount of heat radiated by the reactor is greater than the heat of formation of carbon tetrachloride. In these cases, the mixture of chlorinated aliphatic compounds with benzene offers the advantage to compensate the heat of formation of the reactor because in the perchlorination benzene gives off a larger amount of heat than the higher chlorinated aliphatic compounds.

The proportion of benzene to chlorinated aliphatic compounds may vary within wide limits, a possible contamination of the benzene with chlorinated aliphatic compounds or a contamination of the chlorinated aliphatic compounds with benzene being included. The content of impurities may amount to about 1 percent. The accuracy of the analytic mode of their determination in such a substance mixture may distinctly vary. It is advantageous to use a mixture of chlorinated aliphatic compound or compounds with 2 to 22 percent of benzene.

Suitable chlorinated aliphatic compounds to be used in the process of the invention are chloromethyl, methylene chloride, chloroform, chloroacetylene, vinyl chloride, di-, tri-, and tetrachloroethylene, mono-, di-, tri-, tetra-, penta-, and hexachloroethanes, mono-, poly-, and perchlorinated propanes and propenes, butanes, butenes, and butadienes, as well as chlorinated derivatives of higher aliphatic alkanes, alkenes, polyalkenes and alkines and mono-, poly-, and perchlorinated cycloaliphatic compounds, for example hexachlorocyclohexane.

The temperature in the prereaction zone should be slightly above the melting point of the mixture of benzene and chlorinated aliphatic compounds used. In the main reaction zone in most cases the temperature may be a little below, for example about 50° C., the temperature required with the use of pure benzene. The other conditions for the reaction of mixtures of benzene and chlorinated aliphatic compounds are the same as those specified above.

In the process of the present invention there may also be used mixtures of chlorinated aliphatic or aromatic compounds which, except for a sulfur content below 200 milligrams per kilogram, need not meet any special requirements as to purity. When mixtures of benzene and chlorinated aliphatic compounds are used, small amounts of impurities, such as ethers, aldehydes, alcohols, carboxylic acids and acetates, do not inhibit the reaction.

The temperature in the reactor (main reaction zone) should be in the range of from 400° to 800° C., preferably 560° to 620° C. The reactor can be heated by one of the common means, preferably electrically or with hot combustion gas.

When the process is carried out in a sufficiently large prereactor and main reactor, liberated heat should be sufficient to maintain the reaction temperature. It may even be possible that the desired reaction temperature must be maintained by additional cooling.

Although the feedstock and chlorine are pumped into the reactor in the liquid state, the proper reaction takes place in the gaseous phase. At the indicated reaction temperatures in the range of from 400° to 800° C., all starting components and carbon tetrachloride are in an above-critical, i.e. gaseous state. According to its partial pressure hexachlorobenzene, which is possibly formed as intermediate product, is also present in vaporous form.

As material for the reactor and prereactor nickel withstands the strong corrosion of chlorine and hydrogen chloride at temperatures of about 600° C. Pure nickel is preferred, but steels containing a high proportion of nickel and special alloys may also be used. The pressure load of the reactor at the high temperatures is taken up by a jacket of high temperature resistant steel.

The reaction of the feedstock with chlorine should be carried out continuously. After separation of carbon tetrachloride and complete or partial separation of hexachlorobenzene, if any, and other by-products possibly formed, the unreacted chlorine can be recycled and reused. The hexachlorobenzene possibly formed in small amounts can also be reused and quantitatively transformed into carbon tetrachloride under the indicated pressure and temperature conditions.

The following examples illustrate the invention.

COMPARATIVE EXAMPLE

A vertical reaction tube of high grade steel withstanding a nominal pressure of 1,600 atmospheres, which tube was lined with nickel, was used for the reaction. The reactor had a length of 3,300 mm, an outside diameter of 89 mm and an inside diameter of 40 mm. The tube was divided into a prereaction zone and a main reaction zone by different heating. The lower electric jacket heating surrounding the reaction tube for a length of 1,100 mm was heated to a temperature of at most 250° C. The temperature was measured with an inside thermoelement. This section comprising a volume of 1.4 liters was the prereaction zone. The upper electric jacket heating was adjusted in a manner such that the internal temperature, measured with a shiftable thermoelement, amounted to 600° C. The upper section comprising a volume of 2.7 liters constituted the main reaction zone. The space-time-yield was calculated with respect to this volume. The reaction components, i.e. chlorine and the organic compounds were pumped in the liquid state at room temperature by means of a piston pump into the lower end of the reactor. The reaction mixture was withdrawn at the head of the reactor and cooled at about 250° C. in a cooler lined with nickel. At the end of the cooler a relief valve was mounted to maintain constant the desired pressure in the reactor. The pressure-released gases were further cooled in a preliminary separator operated at atmospheric pressure. The preliminary separator was an empty vessel having a capacity of about 10 liters without special cooling means. In the separator practically all hexachlorobenzene separated. In a cooling coil the reaction gas was then cooled at about −75° C. whereby carbon tetrachloride and chlorine condensed. The unreacted hydrogen chloride was measured in a gas meter and analyzed to detect possibly entrained chlorine.

At a temperature of 220° C. in the prereaction zone and of 600° C. in the main reaction zone and under a pressure of 60 atmospheres gauge there were pumped into the apparatus per hour 297 grams of benzene (3.59 moles)
5.8 kilograms of chlorine (53 percent excess)
from which
1,985 grams of carbon tetrachloride and
404 grams of hexachlorobenzene were obtained per hour, corresponding to a rate of conversion of 60.2 percent to carbon tetrachloride and 39.5 percent to hexachlorobenzene, calculated on the benzene used. The space-time-yield was 736 grams per liter per hour.

EXAMPLE 1

The reaction was carried out in the apparatus described above. The temperature in the prereaction zone was 140° C. and in the main reaction zone it was 600° C. Under a pressure of 240 atmospheres gauge 281.5 grams of benzene (3.61 moles) and
6.19 kilograms of chlorine (63.8 percent excess)
were pumped in per hour from which
3,240 grams of carbon tetrachloride and
26 grams of hexachlorobenzene were obtained per hour, corresponding to a rate of conversion of 97.1 percent to carbon tetrachloride and of 2.0 percent to hexachlorobenzene, calculated on the benzene used. The space-time-yield was 1,200 grams per hour per liter.

In order to obtain the above conversion and space-time-yield under a pressure of 100 atmospheres gauge, the other conditions remaining same, the temperature in the main reaction zone must be raised to 660° C.

EXAMPLE 2

The reaction was carried out in the apparatus used above. The temperature was 115° C. in the prereaction zone and 600° C. in the main reaction zone. Under a pressure of 280 atmospheres gauge 792 grams of benzene (10.1 moles) and
15.7 kilograms of chlorine (45 percent excess)
were pumped in per hour from which
9,270 grams of carbon tetrachloride and
32 grams of hexachlorobenzene were obtained per hour, corresponding to a rate of conversion of 98.8 percent of carbon tetrachloride and 1.1 percent of hexachlorobenzene, calculated on the benzene used. The space-time-yield was 3,435 grams of carbon tetrachloride per liter of reaction space per hour.

EXAMPLE 3

The reaction was carried out in the apparatus used in the preceding examples. The temperature was 120° C. in the prereaction zone and 600° C. in the main reaction zone. Under a pressure of 260 atmospheres gauge there were pumped into the reactor 6.800 grams of a mixture heated at 80° C. and consisting of 7.0 percent of benzene
14.4 percent of $CCl_4$
19.7 percent of tetrachloroethylene
0.5 percent of trichloroethylene
1.0 percent of pentachloroethane
57.4 percent of hexachloroethane and
9,720 grams of chlorine
from which
13,670 grams of carbon tetrachloride and
228 grams of hexachlorobenzene were obtained per hour. Assuming a conversion of the aliphatic components of the feedstock of 100 percent, the rate of conversion of the benzene to carbon tetrachloride was 87 percent, the space-time-yield being 5,060 grams of carbon tetrachloride per liter of reaction space per hour.

What is claimed is:

1. In the process for the manufacture of carbon tetrachloride from benzene, mixtures of benzene and chlorinated aromatic hydrocarbon compounds, mixtures of benzene and chlorinated aliphatic hydrocarbon compounds, or chlorinated aromatic compounds, with chlorine in the absence of catalysts in stoichiometric proportions or with an excess amount of chlorine of up to 300 percent under pressure by passing the reaction components in a first reaction stage through a prereaction zone kept at a temperature in the range of from 6° to 400° C. and reacting the said reaction components in a second reaction stage in the gaseous phase in a corrosion resistant reactor at a temperature in the range of from 400° to 800° C., the improvement of carrying out the reactions in the prereaction zone and in the main reaction zone under a pressure in the range of from above 200 to 700 atmospheres gauge.

2. The process of claim 1, wherein the reaction is carried out under a pressure of from 240 to 350 atmospheres gauge.

* * * * *